(12) United States Patent
Donaldson et al.

(10) Patent No.: US 7,957,847 B2
(45) Date of Patent: Jun. 7, 2011

(54) VOLTAGE REGULATING SYSTEMS RESPONSIVE TO FEED-FORWARD INFORMATION FROM DETERMINISTIC LOADS

(75) Inventors: James Eddy Donaldson, Morgan Hill, CA (US); Bryan Scott Rowan, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 1128 days.

(21) Appl. No.: 11/241,046

(22) Filed: Sep. 30, 2005

(65) Prior Publication Data

US 2007/0078568 A1 Apr. 5, 2007

(51) Int. Cl.
*G05D 3/12* (2006.01)
(52) U.S. Cl. .................. 700/298; 323/224; 324/416
(58) Field of Classification Search ............ 360/46, 360/51, 62; 700/298, 10, 22, 44, 52, 297; 323/224, 284
See application file for complete search history.

(56) References Cited

U.S. PATENT DOCUMENTS

| | | | |
|---|---|---|---|
| 4,425,612 A | | 1/1984 | Bahler et al. |
| 5,258,903 A | * | 11/1993 | Rodriguez-Cavazos ... 363/21.05 |
| 5,905,407 A | * | 5/1999 | Midya ............... 330/10 |
| 5,926,333 A | * | 7/1999 | Bang ............... 360/51 |
| 6,373,033 B1 | | 4/2002 | De Waard et al. |
| 6,529,973 B1 | * | 3/2003 | Spaur ............... 710/60 |
| 6,593,725 B1 | * | 7/2003 | Gallagher et al. ........... 323/284 |
| 6,639,373 B2 | * | 10/2003 | Knight et al. .......... 318/500 |
| 6,724,174 B1 | * | 4/2004 | Esteves et al. ........... 323/224 |
| 6,894,471 B2 | * | 5/2005 | Corva et al. ............ 323/282 |
| 6,906,502 B2 | | 6/2005 | Kernahan et al. |
| 7,019,503 B1 | | 3/2006 | Ortiz et al. |
| 7,038,435 B2 | * | 5/2006 | Ortiz et al. ........... 323/282 |
| 7,292,015 B2 | * | 11/2007 | Oswald et al. ............ 323/268 |
| 7,441,137 B1 | * | 10/2008 | Mimberg ............... 713/340 |
| 2003/0160597 A1 | | 8/2003 | Huang et al. |

(Continued)

FOREIGN PATENT DOCUMENTS

DE 42 40 984 7/1993

(Continued)

OTHER PUBLICATIONS

National SemiConductor LM3475, "Hysteretic PFET Buck Controller," Jan. 2005, pp. 1-14.

(Continued)

*Primary Examiner* — Kidest Bahta
*Assistant Examiner* — Sheela Rao
(74) *Attorney, Agent, or Firm* — Steven J. Cahill

(57) ABSTRACT

Voltage regulating systems are provided that adjust their output control signals in response to feed-forward information that is indicative of deterministic changes in the load current. A feed-forward circuit provides a feed-forward signal in response to an input signal generated from a source that is external to the voltage regulating system. The voltage regulator systems can proactively respond to the predictive information by adjusting their output, thereby improving the regulation tolerance to dynamic loading. As an example, the feed-forward information can include signals indicating multiple deterministic events that affect the load. Signals from multiple events can be summed together to generate a feed-forward term. As another example, the voltage regulating systems can be responsive to feedback information and feed-forward information from internal to the regulator, in addition to external deterministic information.

23 Claims, 5 Drawing Sheets

U.S. PATENT DOCUMENTS

| | | |
|---|---|---|
| 2004/0062058 A1 | 4/2004 | Hann et al. |
| 2005/0009378 A1* | 1/2005 | Chloupek et al. ............... 439/43 |
| 2005/0088162 A1 | 4/2005 | Lederer |
| 2005/0184712 A1 | 8/2005 | Wei et al. |
| 2005/0190475 A1* | 9/2005 | Poss ............................... 360/46 |

FOREIGN PATENT DOCUMENTS

| | | |
|---|---|---|
| EP | 0 093 902 | 11/1983 |

OTHER PUBLICATIONS

European Patent Office, European Search Report and Search Opinion for European patent application EP 06 25 3669, Apr. 1, 2008.

State Intellectual Property Office (SIPO) of China, First Office Action for Chinese patent application 200610121483.6, counterpart to U.S. Appl. No. 11/241,046.

* cited by examiner

VOLTAGE REGULATING SYSTEMS RESPONSIVE TO FEED-FORWARD INFORMATION FROM DETERMINISTIC LOADS

BACKGROUND OF THE INVENTION

1. Field of the Invention

The present invention relates to voltage regulating systems, and more particularly, to voltage regulating systems that are responsive to feed-forward information indicative of deterministic changes in the load current.

2. Description of the Related Art

A voltage regulator is a circuit that provides a substantially constant output voltage to a load from an input voltage source. Switching voltage regulators and linear voltage regulators are two types of voltage regulators. In linear voltage regulators, a pass element (e.g., a transistor) is coupled in series between the input voltage source and the load. The linear voltage regulator controls the current through and/or voltage across the pass element to maintain a constant output voltage. Another possible feature of such a regulator may be to regulate the output current in addition to the output voltage.

In a switching voltage regulator, a switch (e.g., a transistor) is coupled in series between the input voltage source and the load. The voltage regulator turns the switch on and off to regulate the output current or voltage or both and to maintain a constant output voltage. Voltage regulators are designed to operate under conditions of changing load current to maintain the output voltage within a specified tolerance range. A common design goal for a voltage regulator is to minimize the difference between the actual output voltage and a desired output voltage. The difference between the actual and the desired output voltage is referred to as the regulation error.

Feedback techniques are the most common methods for reducing the regulation error. In a voltage regulator with feedback, a signal from the output is fed back into the regulator and used to control the current or voltage or both that is provided to the load. Because feedback control is reactive, the output voltage or output current must first experience a deviation, before the regulator can respond to correct it. However, when significant changes in the load current occur, the deviation in the output voltage can be large enough to exceed acceptable operating voltage limits, before the regulator responds and causes the output voltage to recover.

One possible solution involves increasing the bandwidth of the voltage regulator control system so that it reacts more quickly to the regulation error. The downside of this solution for switching voltage regulators can be a loss of regulator efficiency, increased power dissipation, loss of noise margin, and less than optimal transient response.

Another possible solution involves using a multi-phase voltage regulator. The downside of multi-phase switching voltage regulators is that they can increase the cost and the electrical component count. Another solution is to use linear regulators. However, linear regulators are less efficient than switching voltage regulators and cause increased power dissipation. These problems occur because a linear regulator operates the pass element in its linear region, and causes the pass element to be on all the time.

Yet another solution involves incorporating phase lead feedback compensation for improving the responsiveness of the regulator. However, this method can cause a switching regulator to over-respond to a change in load current and to lose regulator stability.

It would therefore be desirable to provide voltage regulators that can maintain a regulated output voltage within a tight tolerance range, while being able to respond to significant changes in the load current.

BRIEF SUMMARY OF THE INVENTION

The present invention includes voltage regulating systems that adjust their output control signals in response to feed-forward information that is indicative of a deterministic change in the load current. A feed-forward circuit of the present invention provides a feed-forward signal in response to an input signal generated from a source that is external to the voltage regulating system. A voltage regulator system of the present invention can proactively respond to the feed-forward information, thereby improving the regulation tolerance to dynamic loading.

According to one embodiment, the feed-forward information can include signals indicating the imminence of multiple deterministic events that affect the load current. Signals from the multiple events can be summed together to generate a combined feed-forward term that is used to adjust the output current, the output voltage, or both. According to another embodiment, voltage regulating systems of the present invention can be responsive to feedback from the regulator output and feed-forward information from within the regulator, in addition to external deterministic feed-forward information.

Other objects, features, and advantages of the present invention will become apparent upon consideration of the following detailed description and the accompanying drawings, in which like reference designations represent like features throughout the figures.

DETAILED DESCRIPTION OF THE INVENTION

As described above, a voltage regulator provides a regulated output voltage to a load. The voltage regulator changes its output current, the output voltage, or both in response to changes in the load current, the load voltage, or both in order to maintain the output voltage at a substantially constant value.

Changes in the load current can be classified as random or deterministic. Turning of a light switch is an example of a deterministic change. An accurate prediction can be made that a light bulb will draw a predefined amount of current when it is turned on. A voltage regulator that has only feedback control responds the same way to random and deterministic changes in the load current. However, many types of changes in load current are deterministic in nature. These load current changes happen for a specified reason and have a repeatable behavior.

Figure 1A:
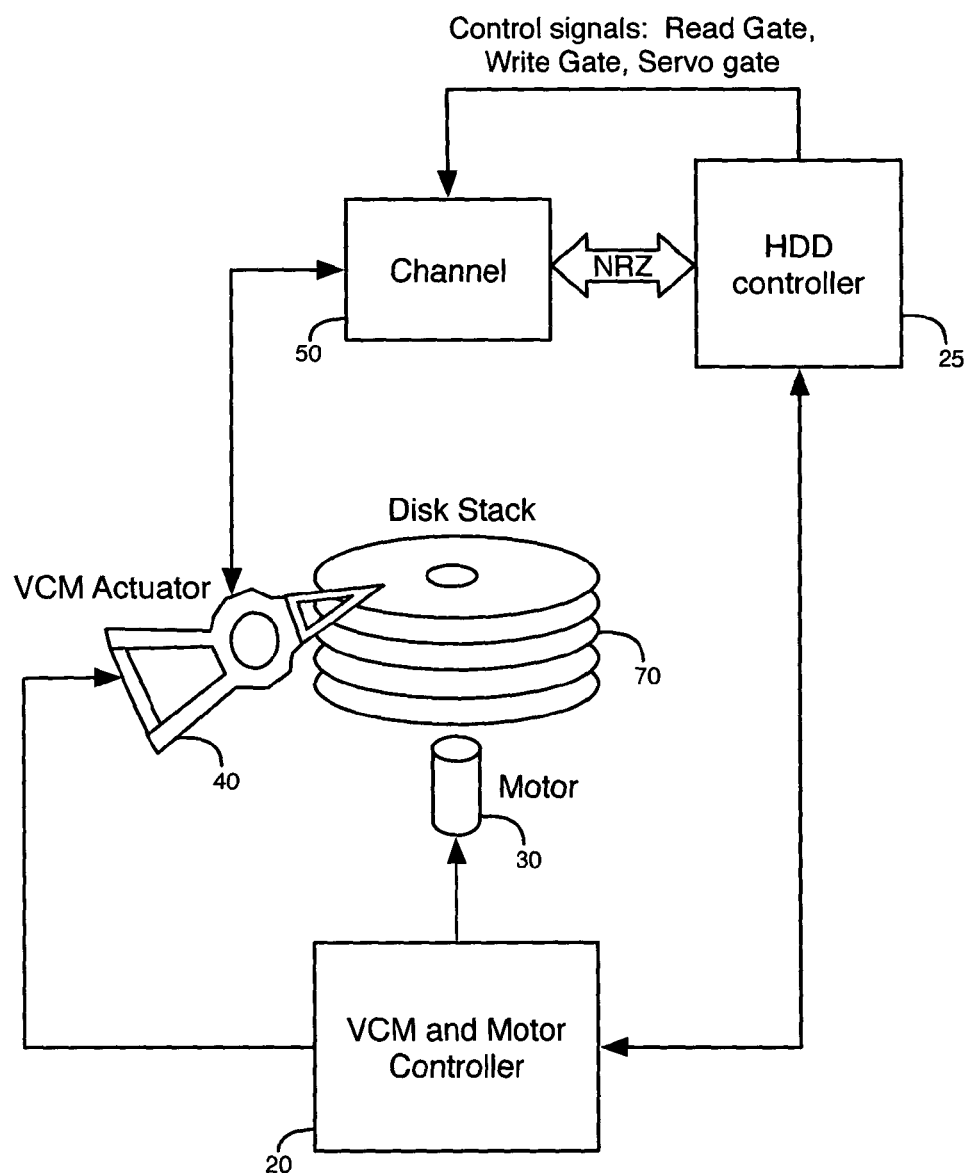
FIG. 1A illustrates an example of a hard disk drive system that can be used with a voltage regulating system of the present invention.

Referring to FIG. 1A, a hard disk drive (HDD) system 10 contains a rotating spindle motor 30 for turning the hard disk stack 70, a voice-coil motor (VCM) actuator 40 used to position head arms to different tracks on the surface of the stack 70, and a read/write head on each head arm for reading and writing data onto a hard disk. A voice-coil motor (VCM) and motor controller chip 20 manages power for performing the electrical-to-mechanical conversions that are needed to rotate the spindle motor and to move the actuator. A HDD controller manages all of the operations of HDD system 10.

When the hard disk drive is commanded to read data from a hard disk, the hard disk drive system 10 causes the actuator 40 to position the read/write head over the desired read location. When the read/write head gets to the desired read location, the HDD controller 25 sends a read gate signal to the data channel 50. The read gate signal is a request for the data channel to start fetching data from the disk. In response to the read gate signal, the data channel 50 begins to take the actions needed to read the magnetic data on the disk.

The hard disk drive (HDD) controller 25 asserts a write gate signal to write data onto a hard disk. The HDD controller 25 can also assert a servo gate signal to cause the read/write head to read servo information from a hard disk. The servo information is position information that helps the actuator position the read/write head over the correct data track.

A data channel in a hard disk drive (HDD) draws a predictable amount of electrical current from a voltage regulator in response to read gate, write gate, and servo gate signals. Each time a HDD controller sends a read gate signal to the data channel, the data channel subsequently draws a predictable amount of current to analyze the read signal. Also, the amount of current drawn by the data channel in response to a write gate signal or a servo gate signal is repeatable and predictable.

Figure 1B:
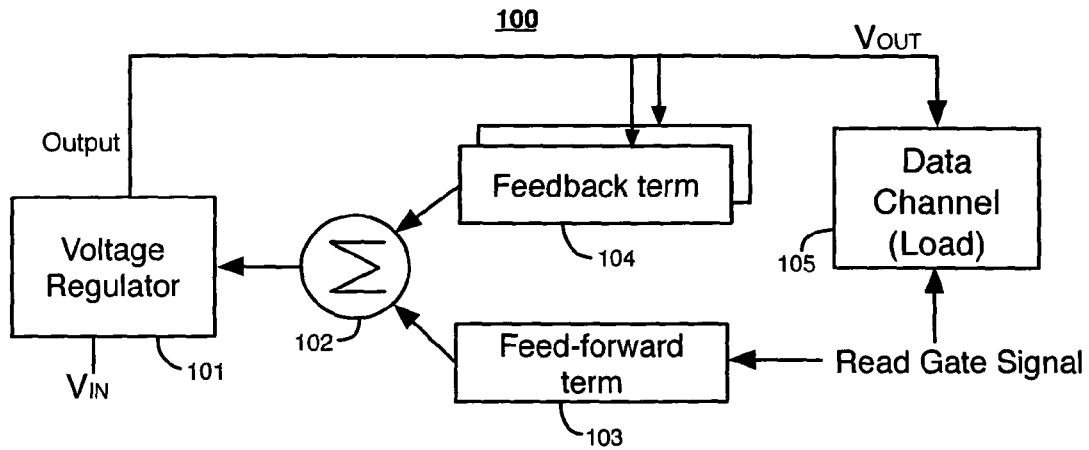
FIG. 1B illustrates a block diagram of a voltage regulating system that is responsive to feed-forward information indicative of deterministic changes in the load current, according to an embodiment of the present invention.

FIG. 1B illustrates a voltage regulating system 100 according to a first embodiment of the present invention. Voltage regulating system 100 includes a voltage regulator 101, a summing node 102, a feed-forward term 103, and one or more feedback terms 104. Data channel 105 is the load in the hard disk drive that draws current from the output of the voltage regulator 101.

Voltage regulator 101 can be a synchronous switching voltage regulator, a non-synchronous switching voltage regulator, a linear voltage regulator, or any other type of voltage regulator. Voltage regulator 101 receives an input voltage $V_{IN}$ and provides an output voltage $V_{OUT}$ at its output to data channel 105. If voltage regulator 101 is a switching regulator, it typically includes an output inductor and an output capacitor for maintaining a continuous output voltage and/or current flow.

Each feedback term 104 receives a feedback signal from the output of voltage regulator 101. The feedback signal can be, for example, a voltage feedback signal that is proportional to the output voltage or a current feedback signal that is indicative of the output current. Each feedback term 104 uses the feedback information to generate a control signal. The control signal is provided to the voltage regulator at the output stage pass element or switch (transistor base or gate) to control the regulator output current, output voltage, or both.

As a specific example, a feedback term 104 can include a resistor divider coupled to the regulator output terminal and an input of an error amplifier or comparator. The error amplifier amplifies the difference between the voltage feedback signal and a reference voltage to generate an error signal. The comparator determines if the error is high or low and outputs a corresponding logical control signal. The voltage regulator uses the error signal or the logical control signal to control the duty cycle of an output switching transistor so that the output voltage remains substantially constant.

Feedback terms 104 can employ any one or more of a variety of feedback control techniques to control the output current in response to a feedback signal. For example, feedback terms 104 can include any voltage-mode or current-mode techniques that are well known for use in voltage regulators.

Voltage regulation system 100 can include multiple feedback terms 104 that are responsive to multiple feedback signals. For example, voltage regulation system 100 can be responsive to a voltage feedback signal from the output voltage and a current feedback signal from the output current. Both the current and the voltage feedback signal can be used to generate a combined control signal for the voltage regulator at summing node 102 or at various points within the regulator's control loop. Voltage regulator 101 uses the combined control signal to adjust the output current, the output voltage, or both, to maintain a substantially constant output voltage.

Voltage regulation system 100 also has a feed-forward term 103 that is responsive to a read gate signal. Feed-forward term 103 provides a feed-forward signal to voltage regulator 101 in response to an input signal that is generated from a source external to the voltage regulating system and that indicates a deterministic change in the load. In the example of FIG. 1B, the input signal is a read gate signal generated from a hard disk drive system.

When a HDD controller asserts a read gate signal, the data channel load 105 responds by drawing significantly more load current from voltage regulator 101. The read gate signal indicates deterministic changes in the load current in data channel 105. Feed-forward term 103 receives the read gate signal and, in response, generates a read gate feed-forward signal as an output.

Figure 1C:
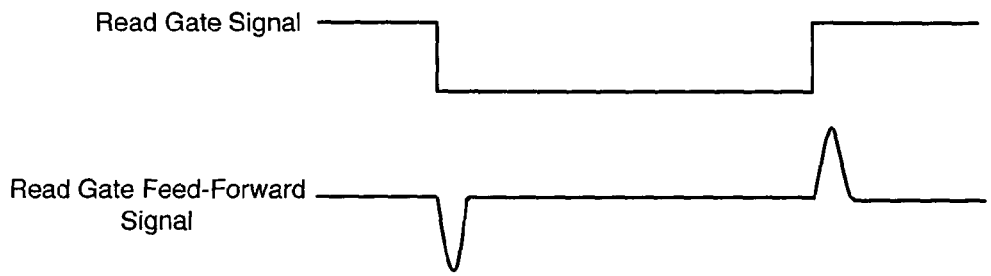
FIG. 1C is a graph that illustrates examples of a read gate signal and a read gate feed-forward signal, according to an embodiment of the present invention.

Examples of the read gate and read gate feed-forward signals are shown in FIG. 1C. The read gate signal is a logic signal. The feed-forward term 103 converts the read gate signal into a read gate feed-forward signal. A falling edge of the read gate signal indicates the start of a read operation for a sector of data, and a rising edge of the read gate signal indicates the end of a read operation. The feed-forward term generates a downward pulse in the read gate feed-forward signal after each falling edge of the read gate signal, and a upward pulse in the read-gate feed-forward signal after each rising edge of the read gate signal.

Feed-forward term 103 provides the read gate feed-forward signal to voltage regulator 101 at summing node 102. The one or more feedback control signals and the read gate feed-forward signal are combined at summing node 102 and provided to the voltage regulator 101, as shown in FIG. 1B. Voltage regulator 101 uses the combined signal generated at summing node 102 to regulate the output current (and/or other control signals) provided to load 105.

A change in the read gate signal is indicative of a deterministic change in the load current drawn by data channel 105. When voltage regulator 101 receives a signal from summing node 102 that is indicative of a read gate function, voltage regulator 101 increases its output current to match the deterministic change that the load current it is about to experience.

For example, if a downward edge in the read gate feed-forward signal indicates that a read channel function will commence, voltage regulator 101 increases its output current by an amount equal to the predicted increase in the data channel load current. After the read gate function is complete, voltage regulator 101 decreases its output current in response to a rising edge in the read gate feed-forward signal by an amount equal to the predicted decrease in the data channel load current. According to further embodiments of the present invention, the read gate logic signal is inverted in order to create the appropriate signal polarity or phase, to achieve the desired response in the voltage regulator.

The present invention is advantageous, because it allows voltage regulator 101 to adjust its output to match a deterministic change in the load before $V_{OUT}$ varies. significantly. Feed-forward term 103 can cause the output current of regulator 101 to match a deterministic change in the load current before feedback terms 104 can respond to the change in $V_{OUT}$.

Figure 2A:
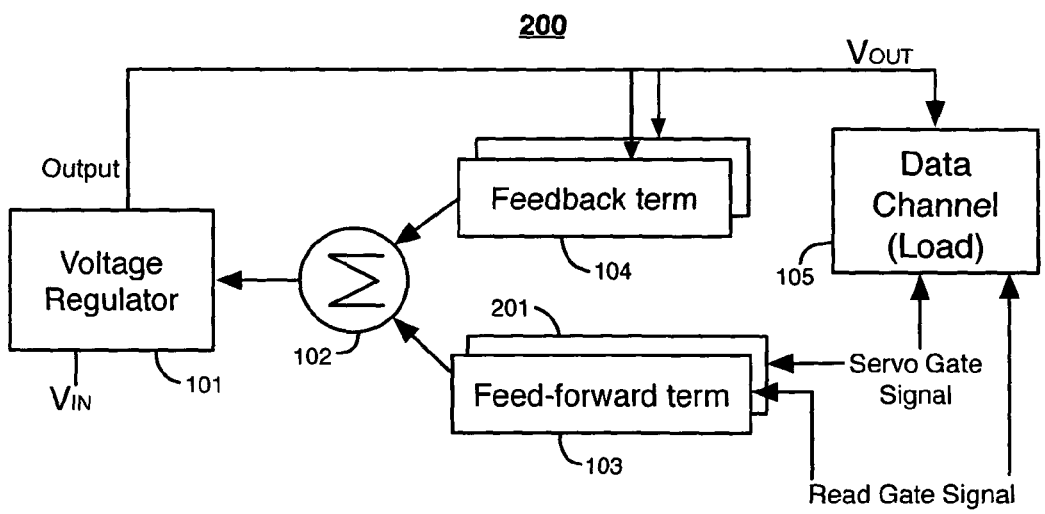
FIG. 2A illustrates a block diagram of a voltage regulating system that is responsive to feed-forward information from signals indicating two deterministic events that affect the load current, according to another embodiment of the present invention.

FIG. 2A illustrates a voltage regulating system 200 according to a second embodiment of the present invention. System 200 includes all of the elements of system 100 and an additional feed-forward term 201. Feed-forward term 201 receives a servo gate signal. A servo gate signal is a signal generated by a HDD controller to cause data channel 105 to read a servo track on a hard disk.

Figure 2B:
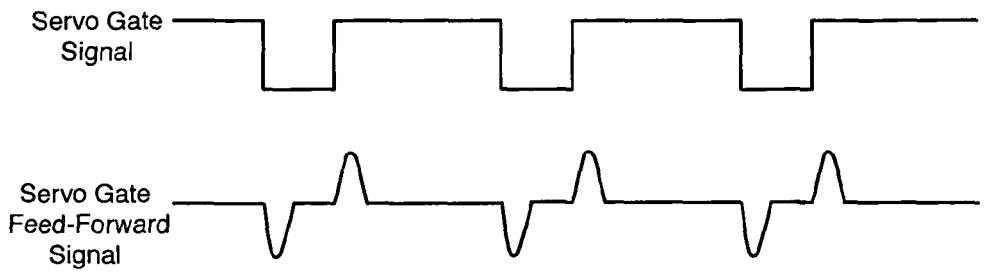
FIG. 2B is a graph that illustrates examples of a servo gate signal and a servo gate feed-forward signal, according to an embodiment of the present invention.

An example of a digital servo gate signal is illustrated in FIG. 2B. Feed-forward term 201 generates the servo gate feed-forward signal in response to the servo gate signal. Rising and falling pulses in the servo gate feed-forward signal correspond to rising and falling edges, respectively, of the digital servo gate signal. The feedback control signals, the read gate feed-forward signal, and the servo gate feed-forward signal from feed-forward term 201 are summed at node 102 and then provided to regulator 101.

In the example of FIG. 2B, data channel 105 increases its load current by a predictable amount in response to a falling edge in the servo gate signal, which occurs at the start of a servo read operation. Data channel 105 increases its load current to perform the servo read operation. Data channel 105 decreases its load current by a predictable amount in response to a rising edge in the servo gate signal, which occurs at the termination of the servo read operation.

Thus, data channel 105 increases its load current by a predictable amount during a servo read, and decreases its load current by a predictable amount after the servo read. According to the present invention, voltage regulator 101 responds to the servo gate signal to adjust its output current to match a predicted change in the load current so that the output voltage remains substantially constant.

Figure 3:
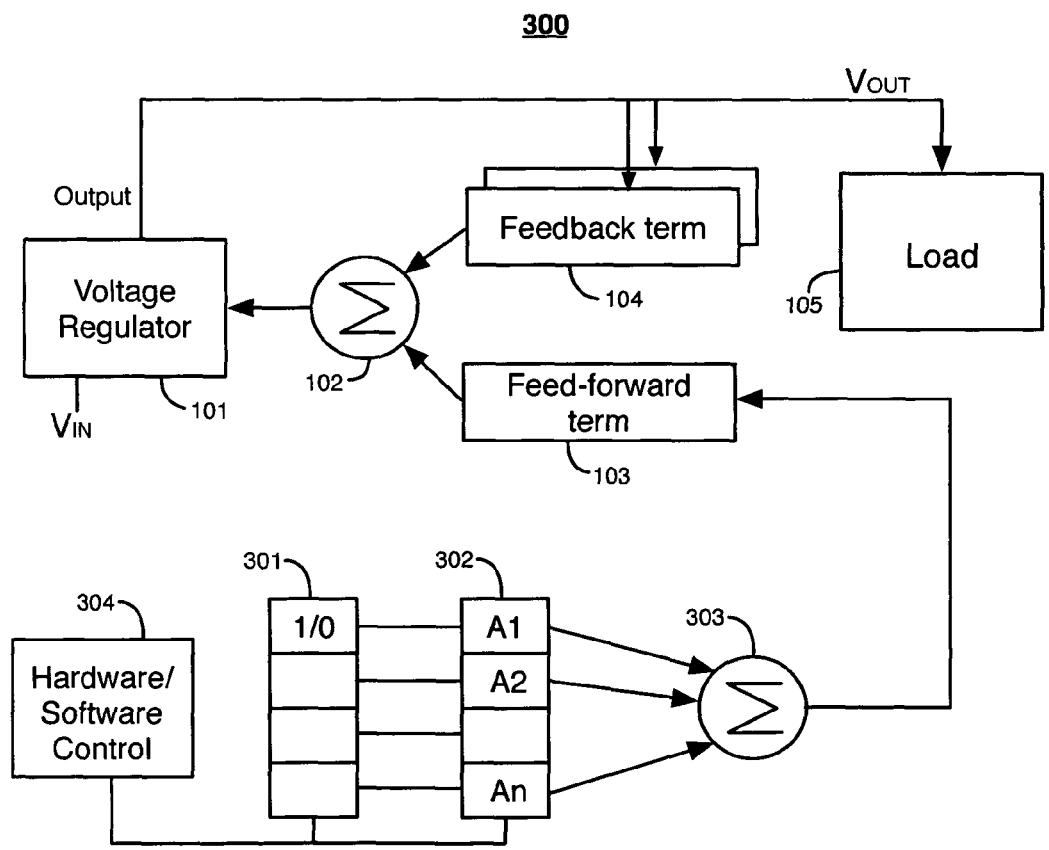
FIG. 3 illustrates a block diagram of a voltage regulating system that is responsive to feed-forward information from signals indicating several different deterministic events that affect the load current, according to yet another embodiment of the present invention.

FIG. 3 illustrates a voltage regulating system 300 that is responsive to feed-forward information indicative of deterministic changes in the load current, according to a third embodiment of the present invention. Voltage regulating system 300 includes all of the elements of system 100, term selector register 301, variable weighting register 302, summing circuit 303, and hardware/software control unit 304. Voltage regulating system 300 is responsive to feed-forward signals indicative of several different deterministic events that affect the load current at load 105.

Control unit 304 can be a software-based or hardware-based system. Control unit 304 provides control signals that are indicative of deterministic changes in the load current drawn by load 105. For example, control unit 304 can provide a read gate signal, a servo gate signal, a write gate signal, etc. Control unit 304 stores the current states of these control signals in term selector register 301. For example, each storage unit in register 301 can store one control bit (1 or 0) to indicate the state of each control signal.

The control bits stored in register 301 are transmitted to variable weighting register 302. The control bits are multiplied by one of some number, "n", of weighting coefficients, called A1 through An, respectively, in register 302 to provide a desired weight for each control signal. The weighting coefficients are set to values based on a weight to be given to each of the "n" control signals with respect to their desired effect on the output current of regulator 101. For example, the weighting coefficients can be selected to cause the read gate signal to have more of an effect on the output current of regulator 101 than the servo gate signal.

The outputs of variable weighting register 302 are summed together at summing circuit 303. The summed output signal of summing circuit 303 is converted into a feed-forward signal by feed-forward term 103. The feed-forward signal is summed with the feedback control signals at summing node 102. The summed output signal of node 102 provided to regulator 101 to control the output current.

Figure 4:
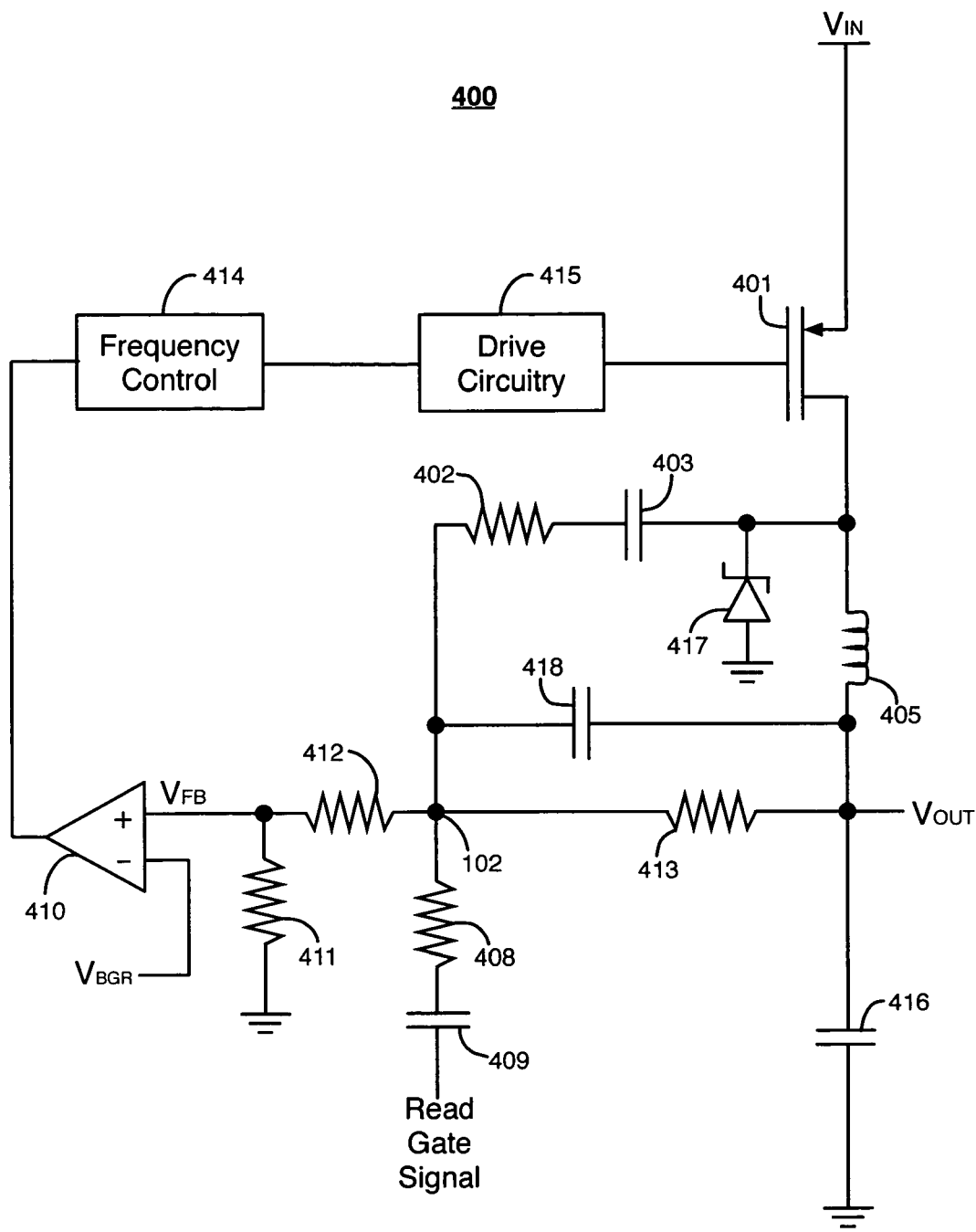
FIG. 4 illustrates a schematic diagram of a switching voltage regulating system that is responsive to feed-forward information indicating deterministic changes in the load current, according to still another embodiment of the present invention.

FIG. 4 illustrates a schematic diagram of a switching voltage regulating system 400 that is responsive to feed-forward information indicative of deterministic changes in the load current, according to a further embodiment of the present invention. Voltage regulating system 400 includes a p-channel switching transistor 401. The source of transistor 401 is coupled to receive an input voltage $V_{IN}$. The drain of transistor 401 is coupled to an output inductor 405 and a Schottky diode 417. Output inductor 405 is also coupled to an output capacitor 416, which stores charge that is provided to a load. The load receives a regulated output voltage $V_{OUT}$.

According to further embodiments of the present invention, p-channel switching transistor 401 can be replaced an n-channel switching transistor that has corresponding support from drive circuitry 415, a Bipolar junction switching transistor (e.g., NPN or PNP BJT), a pass element, etc. Diode 417 can be replaced a second switching transistor that has corresponding support from drive circuitry 415 to allow for synchronous rectification.

System 400 has a feedback term that is used to regulate the output voltage in response to changes in the output voltage. The feedback term is implemented by a feedback loop. The feedback loop includes resistors 411-413, amplifier/comparator 410, frequency control 414, and drive circuitry 415. Three feedback resistors 411, 412, and 413 form a resistor divider that generate a feedback voltage $V_{FB}$, which is proportional to the output voltage $V_{OUT}$.

A hysteretic comparator 410 compares the feedback voltage to a bandgap reference voltage $V_{BGR}$ to generate a control signal. A hysteretic comparator has two threshold voltages that are set based on resistor 412.

Alternately, circuit 410 can be an error amplifier 410 that amplifies the difference between the feedback voltage $V_{FB}$ and the bandgap reference voltage $V_{BGR}$ to generate a control signal. The control signal is indicative of a deviation in the output voltage $V_{OUT}$ from a target value.

The control signal from circuit 410 is provided to frequency control circuitry 414. Frequency control circuitry 414 generates a duty cycle control signal in response to the control signal from circuit 410. The drive circuitry 415 turns switching transistor on and off in response to the duty cycle control signal. Frequency control circuitry 414 can regulate the duty cycle of switching transistor 401 using pulse width modulation for a constant switching frequency (e.g., using an error amplifier) or pulse frequency modulation for a variable frequency (e.g., determined by the comparator output signal provided using a hysteretic comparator).

When switching transistor 401 is on, current flows from $V_{IN}$ through transistor 401 and inductor 405 to the load, and the current in the inductor 405 ramps up. When transistor 401 is off, current flows from ground through the Schottky diode 417 and inductor 405 to the load. Current in inductor 405 ramps down when transistor 401 is off.

Frequency control circuitry 414 regulates the duty cycle of switching transistor 401 so that the average output current through inductor 405 matches the load current to maintain $V_{OUT}$ at a substantially constant value. When amplifier/comparator 410 senses a change in the output voltage $V_{OUT}$, the feedback loop varies the duty cycle of switching transistor 414 so that the average inductor current matches the load current.

System 400 also includes a feed-forward circuit 402-403 that compensates by deriving a signal from the inductor voltage transient and a feedback capacitor 418 that compensates for changes at the output. Feedback capacitor 418 is coupled in parallel with resistor 413 between output capacitor 416 and summing node 102. The output voltage ripple causes a current to be sourced through capacitor 418 during each switching cycle. Capacitor 418 reduces the sensing impedance to transient signals to reduce the output voltage ripple. Capacitor 418 can also increase the operating frequency of the regulator in a variable frequency regulator. Capacitor 418 can cause the control circuitry to respond to changes in the output voltage faster than the resistor divider. However, the feedback path through capacitor 418 requires a change in the output voltage before the regulator can adjust the duty cycle of transistor 401.

Resistor 402 and capacitor 403 are coupled in series between the drain of transistor 401 and summing node 102 in system 400. Resistor 402 and capacitor 403 are also added to reduce the output voltage ripple by injecting a ramp signal to the feedback voltage at the non-inverting input of comparator 410. For example, comparator 410 causes transistor 401 to turn off in response to the voltage from resistor 402 and capacitor 403 before $V_{OUT}$ has increased to the feedback hysteresis point to help reduce overshoot in $V_{OUT}$ if the load current decreases quickly.

Also, comparator 410 causes transistor 401 to turn on in response to the decreasing ramp voltage from resistor 402 and capacitor 403 before $V_{OUT}$ has drooped below the hysteresis point, thus reducing undershoot in $V_{OUT}$ if the load current suddenly increases. The alternating current through resistor 402 and capacitor 403 also helps to remove the modulating effect that the switching duty cycle of transistor 401 has on the output voltage $V_{OUT}$ as a function of load current. However, the path through resistor 402 and capacitor 403 does not provide a feed-forward term indicative of deterministic changes in the load current.

Passive components 411-413, 418, 402, and 403, all are tuned to provide a weighted contribution on the value of feedback voltage $V_{FB}$ at the non-inverting input of amplifier/comparator 410. In another embodiment of the invention, this may be an inverting configuration.

A feed-forward circuit of the present invention provides feed-forward information in voltage regulating system 400 that indicates deterministic changes in the load current. The feed-forward circuit includes resistor 408 and capacitor 409. Capacitor 409 receives a read gate signal at one of its inputs. Capacitor 409 and resistor 408 convert the read gate signal into the read gate feed-forward signal, as shown in FIG. 1C. Capacitor 409 blocks the DC component of the read gate signal, passing only an AC component of the read gate signal. Thus, the read gate signal does not affect the output current of the voltage regulator when the read gate signal is in a steady state. After the read gate feed-forward signal returns to a steady state, the feedback loop can effectively regulate the output current in response to random changes in the output voltage.

To the extent there are AC components to the output and feedback voltages, steady state levels of the read gate signal may influence the response. Buffering and active filtering of signals to avoid the impact on the equivalent impedances in the circuit are ways to avoid this effect.

Resistor 408 provides a damping factor. Resistor 408 and capacitor 409 are merely one example of a feed-forward circuit of the present invention. A feed-forward circuit can also be implemented software or in another configuration of hardware components.

The voltage changes in the read gate feed-forward signal correspond to the edges of the read gate signal. They affect the voltage feedback signal $V_{FB}$ at the beginning and the end of the read operation. As described above, a falling edge of the read gate causes a read operation to begin. Resistor 408 and capacitor 409 generate a falling voltage in the read gate feed-forward signal at summing node 102 in response to a falling edge in the read gate signal. The falling voltage at node 102 causes feedback voltage $V_{FB}$ to decrease, which in turn, causes the feedback loop to increase the on-time of transistor 401, sending more current to the load. Thus, the feed-forward circuitry allows voltage regulating system 400 to increase its output current to match a deterministic increase in the load current during a read function. By accurately matching the output current and the load current, the present invention prevents the output voltage from dropping below its tolerance range at the start of a read function.

A rising edge of the read gate signal causes the read function to end. Resistor 408 and capacitor 409 generate a rising edge in the read gate feed-forward signal at summing node 102 in response to a rising voltage in the read gate signal. The rising voltage at node 102 causes feedback voltage $V_{FB}$ to increase, which in turn, causes the feedback loop to decrease the on-time of transistor 401, sending less output current to the load. Thus, the feed-forward circuitry allows voltage regulating system 400 to decrease its output current to match a deterministic decrease in the load current after a read function. By accurately matching the output current and the load current, the present invention prevents the output voltage from overshooting its tolerance range after a read function.

The components in a voltage regulating system of the present invention can be implemented entirely on an integrated circuit chip, as discrete components, or as a combination of discrete components and integrated circuit chips. For example, comparator 410, frequency control 414 and drive circuitry 415 can be integrated onto a single chip. In this example, switching transistor 401, output capacitor 416, output inductor 405, resistors 411-413, resistor 402, resistor 408, and capacitors 403, 409, and 418 are all external discrete components.

However, there are drawbacks of having a large number of external components. Specifically, many external components increase the cost and take up a lot of board space. Also, changing the passive component topology changes the impedance at the sensing node as seen by the regulator and the load, as well as the feed-forward sources.

The feed-forward circuitry 408 and 409 of FIG. 4 can be duplicated to receive additional feed-forward signals. However, if multiple feed-forward signals are provided to a voltage regulator, a solution is required that balances the response to the multiple pathways simultaneously. An alternative embodiment buffers the signals from each source such that low impedances can be used to combine (i.e., add or subtract) each contribution without concern for its impact on the other pathways. Then, each individual factor can be weighted independently according to requirements. One way to do this is with programmable control registers 301 as shown in FIG. 3, which eliminate the need for external components to implement the feed-forward terms. According to another embodiment, additional pins are added to a voltage regulator integrated circuit to allow tuning of gains, for example, with a high degree of flexibility. A drawback of additional circuitry is potential increases in feedback error (gains and offsets) for the regulator.

Figure 5:
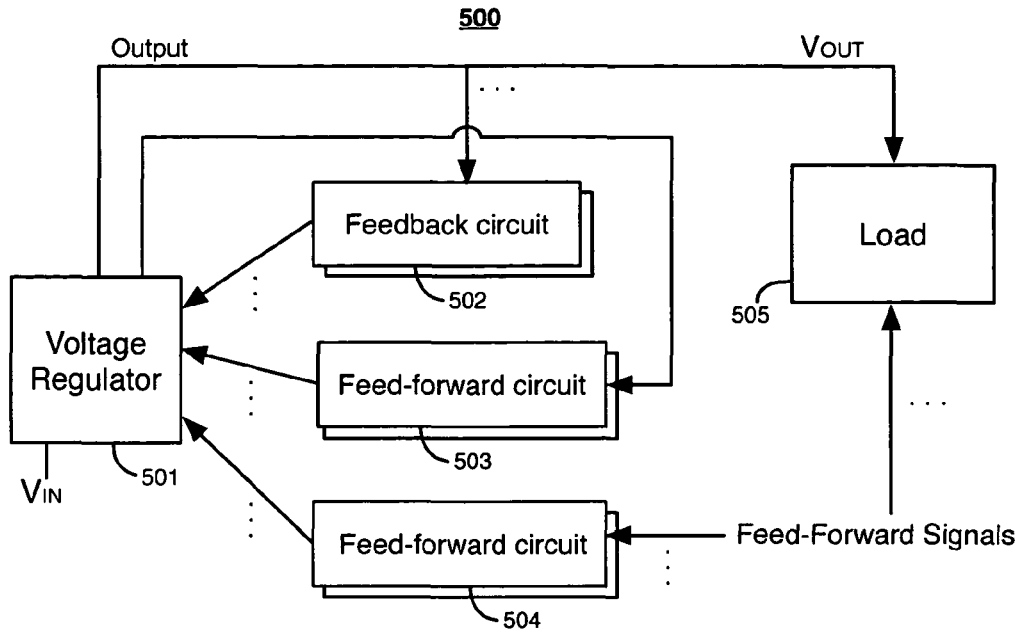
FIG. 5 illustrates a generalized block diagram of a voltage regulating system that is responsive to internal and external feed-forward information according to yet another embodiment of the present invention.

FIG. 5 illustrates a generalized block diagram of a voltage regulating system 500 that is responsive to feed-forward information according to an embodiment of the present invention. Voltage regulating system 500 includes a voltage regulator 501, a feedback circuit 502, and feed-forward circuits 503 and 504. Voltage regulating system 500 provides output current to a load 505. Feedback circuit 502 generates one or more feedback signals from the regulator output. Feed-forward circuit 503 generates one or more feed-forward signals from a node that is internal to the regulator. Feed-forward circuit 504 generates any number of feed-forward signals responsive to external feed-forward information that indicates deterministic changes in the load current. For example, feed-forward circuit 504 can receive one or more signals indicative of deterministic loads and can generate one or more output signals that are used to control an output condition of a voltage regulator. Regulating system 500 can include any number of feed forward circuits 504, e.g., one or more feed forward circuits 504 that receive any number of input signals indicative of deterministic loads and generate any number of feed-forward signals for controlling an output condition of a voltage regulator.

The feedback signals generated by feedback circuit 502, the feed-forward signals generated by feed-forward circuit 503, and the deterministic signals from feed-forward circuit 504 can be provided to separate inputs of voltage regulator 500. For example, a feedback signal from feedback circuit 502 and a feed-forward signal from circuit 504 can be provided to separate inputs of voltage regulator 501. As another example, two feed-forward signals generated by circuit 504 can be provided to separate inputs of voltage regulator 501.

Figure 6:
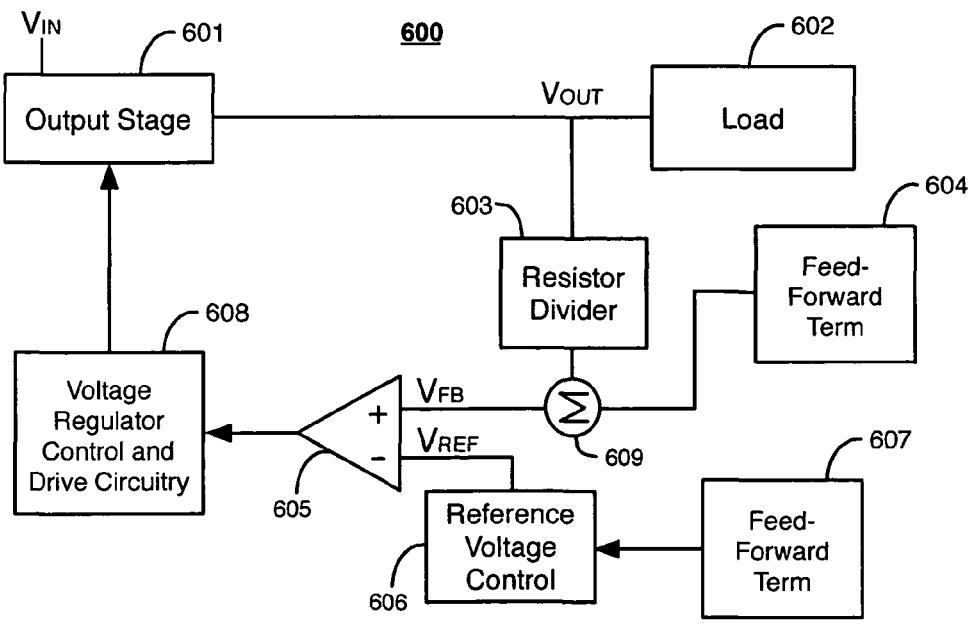
FIG. 6 illustrates a block diagram of a voltage regulating system that receives multiple feed-forward terms indicating deterministic changes in the load current at separate inputs of a voltage regulator, according to another embodiment of the present invention.

FIG. 6 illustrates a block diagram of a voltage regulating system 600 that receives multiple feed-forward terms at separate inputs of a voltage regulator. Voltage regulating system 600 includes an output stage 601, a resistor divider 603, feed-forward terms 604 and 607, reference voltage control circuit 606, circuit element 605, and voltage regulator control and drive circuitry 608. Each of the feed-forward terms 604 and 607 provide signals to regulating system 600 that are indicative of deterministic changes in the load current.

Output stage 601 includes an output inductor, an output capacitor, and an output transistor, which can be, for example, a pass element or a switching transistor. Circuit element 605 can be, for example, a hysteretic comparator or an error amplifier. Voltage regulating system 600 provides output current from $V_{IN}$ through output stage 601 to load 602 at $V_{OUT}$. Resistor divider 603 generates a divided down voltage feedback signal $V_{FB}$ at the non-inverting input of amplifier/comparator 605. Amplifier/comparator 605 compares the voltage feedback signal to a reference voltage $V_{REF}$ from reference voltage control 606 to generate a control signal. Voltage regulator control and drive circuitry 608 uses the control signal to control the amount of current provided to load 602 through output stage 601.

Feed-forward term 604 can provide a feed-forward signal to a summing node 609 that indicates deterministic changes in the load before the changes are fully reflected in $V_{OUT}$. Resistor 408 and capacitor 409 in FIG. 4 are an example of feed-forward term 604. The feed-forward signal from term 604 can be a response to a read gate signal, a write gate signal, a servo gate signal, etc.

Reference voltage control circuit 606 generates a reference voltage $V_{REF}$ that is provided to the inverting input of amplifier/comparator 605. Reference voltage control circuit 606 usually provides a constant reference voltage to the inverting input of amplifier comparator 605. Feed-forward term 607 can provide a feed-forward signal to reference voltage control 606 that indicates deterministic changes in the load current in load 602 before the changes are reflected in $V_{OUT}$. The feed-forward signal from term 607 can be a response to a read gate signal, a write gate signal, a servo gate signal, etc.

Control circuit 606 adjusts reference voltage $V_{REF}$ in response to the feed-forward signal from term 607. Control circuit 606 can, for example, include a microprocessor that has the capability to trim the reference voltage $V_{REF}$ according to an internal pending load change it is predicting. The microprocessor can trim the reference voltage, for example, via a communication bus using reference voltage trimming control registers.

When reference voltage control 606 receives a feed-forward signal from term 607 indicating an increase in the expected load current, control circuit 606 increases the reference voltage $V_{REF}$. In response to the increased reference voltage, amplifier/comparator 605 adjusts its output control signal so that output stage 601 provides more output current to load 602. For example, in response to an increased reference voltage, an error amplifier 605 causes its output error signal to decrease so that duty cycle of a switching transistor in output stage 601 increases. As another example, a comparator 605 causes its output signal to remain low for a longer period of time to increase the duty cycle of a switching transistor in output stage 601.

When reference voltage control 606 receives a feed-forward signal from term 607 indicating a decrease in the expected load current, control circuit 606 decreases the reference voltage $V_{REF}$. In response to the decreased reference voltage, amplifier/comparator 605 adjusts its output control signal so that output stage 601 provides less output current to load 602.

Feed-forward information of the present invention can be used in any device with operating modes that have distinct, deterministic load characteristics. Any mode change is very likely to have a predictable corresponding load change. A mode change is triggered by an event either externally (e.g., pushing a button, receiving a call request, etc.) or internally (e.g., placing a call, firmware-triggered event such as sleep mode timeout from inactivity, etc.).

Cell phones can have events tied to placing and receiving calls, responding to key presses, sending/receiving/displaying data, backlighting, etc. DVDs can have display driver events such as enable/disable display, and selective vs. full-rate refresh. CDs, DVDs, and hard disk drives (HDDs) have events associated with data access such as read/write, idle, active idle, sleep, etc. Any of these events can correspond to a mode change that is associated with a deterministic change in the load current drawn from a voltage regulator. The feed-forward information of the present invention can be used to adjust the output current of a voltage regulator in response to a mode change before the mode change causes a significant deviation in the output voltage. The present invention can allow a voltage regulator to maintain the output voltage within a tighter tolerance range.

The Voice Coil Motor (VCM) current profiles or other data contained in lookup tables in a hard disk drive controller or servo controller can also be used to generate feed-forward control signals according to the present invention. For example, reading/writing internal memory (DRAM or Flash) or communicating over the host bus interface can cause deterministic changes in the load current of a voltage regulator. Therefore, the onset of these functions can be a trigger for a feed-forward term to cause a voltage regulator to pre-compensate for predicted changes in the load current.

Some functions may not have any one single logic signal associated with the onset of the function. However, embedded firmware knows when these functions are going to occur and can be programmed to generate predictive control signals to pre-compensate the voltage regulating system for the event that it is about to induce, or the command to which it is about to respond, etc.

The foregoing description of the exemplary embodiments of the invention has been presented for the purposes of illustration and description. It is not intended to be exhaustive or to limit the invention to the precise form disclosed. A latitude of modification, various changes, and substitutions are intended in the present invention. In some instances, features of the invention can be employed without a corresponding use of other features as set forth. Many modifications and variations are possible in light of the above teachings, without departing from the scope of the invention. It is intended that the scope of the invention be limited not with this detailed description, but rather by the claims appended hereto.

What is claimed is:

1. A voltage regulating system responsive to feed-forward information, the voltage regulating system comprising:
a voltage regulator that receives an input voltage and provides a regulated output voltage to a load at an output terminal; and
a first feed-forward circuit providing at least one first feed-forward signal to the voltage regulator that is indicative of a deterministic change in a current through the load, wherein the first feed-forward circuit provides the first feed-forward signal in response to a first gate signal that is generated by a hard disk drive controller, and the voltage regulator adjusts an output control signal in response to the first feed-forward signal.

2. The voltage regulating system defined in claim 1 wherein the voltage regulator receives the feed-forward signal before the deterministic change is fully reflected in the regulated output voltage.

3. The voltage regulating system defined in claim 1 further comprising:

a feedback circuit that provides a feedback signal to an input of the voltage regulator in response to the regulated output voltage.

4. The voltage regulating system defined in claim 3 further comprising:
a second feed-forward circuit that provides a second feed-forward signal to the voltage regulator in response to an internal condition of the voltage regulator.

5. The voltage regulating system defined in 1 wherein the first feed-forward circuit comprises a resistor coupled in series with a capacitor.

6. The voltage regulating system defined in claim 5 further comprising:
a resistor divider coupled to the output terminal of the voltage regulator and a comparator in the voltage regulator,
wherein the first feed-forward circuit is coupled to the resistor divider.

7. The voltage regulating system defined in claim 1 wherein the first gate signal is a read gate signal.

8. The voltage regulating system defined in claim 1 wherein the first gate signal is a servo gate signal.

9. The voltage regulating system defined in claim 1 wherein the first gate signal is a write gate signal.

10. The voltage regulating system defined in claim 1 further comprising:
a second feed-forward circuit providing at least one second feed-forward signal to the voltage regulator that indicates a deterministic change in a current through the load,
wherein the second feed-forward circuit provides the second feed-forward signal in response to a second gate signal that is generated by the hard disk drive controller, and the voltage regulator adjusts an output control signal in response to the second feed-forward signal.

11. The voltage regulating system defined in claim 10 further comprising:
a feedback circuit that provides a feedback signal to a first input of the voltage regulator in response to the regulated output voltage; and
a reference voltage control circuit that provides a reference voltage signal to a second input of the voltage regulator,
wherein the first feed-forward circuit provides the first feed-forward signal to the feedback circuit, and the second feed-forward circuit provides the second feed-forward signal to the reference voltage control circuit, the reference voltage control circuit varying the reference voltage signal in response to the second feed-forward signal.

12. A voltage regulating system responsive to feed-forward information, the voltage regulating system comprising:
a voltage that receives an input voltage and provides a regulated output voltage to a load at an output terminal;
a first feed-forward circuit providing at least one first feed-forward signal to the voltage regulator that is indicative of a deterministic change in a current through the load, wherein the first feed-forward circuit provides the first feed-forward signal in response to at least one first input signal that is generated from a source external to the voltage regulating system, and the voltage adjusts an output control signal in response to the first feed-forward signal;
a first register that stores signals indicative of conditions that cause deterministic changes in the current through the load;
a second register coupled to the first register that stores coefficients indicative of a variable weight for each of the conditions that cause deterministic changes in the current through the load, wherein the coefficients are multiplied by the signals stored in the first register to generate weighted output signals; and a summing circuit that sums the weighted output signals and provides a summed result to the first feed-forward circuit.

13. A method for providing a regulated output voltage to a load from a voltage regulating system, the method comprising:

adjusting an output current of the voltage regulating system in response to a feedback signal from an output stage of the voltage regulating system;

generating at least one first feed-forward signal indicative of a deterministic change in a current through the load in response to a first gate signal that is generated by a hard disk drive controller; and adjusting an output control signal of the voltage regulating system in response to the first feed-forward signal.

14. The method defined in claim 13 further comprising:

adjusting the output current of the voltage regulating system in response to a second feed-forward signal, the second feed-forward signal being generated in response to a condition in an output stage of the voltage regulating system.

15. The method defined in claim 14 wherein the first feed-forward signal and the second feed-forward signal are provided to separate inputs of the voltage regulating system.

16. The method defined in claim 13 further comprising:

generating a second feed-forward signal that is indicative of a deterministic change in a current through the load in response to at least one second input a second gate signal that is generated from a source external to the voltage regulating system by the hard disk drive controller; and adjusting the output current of the voltage regulating system in response to the second feed-forward signal.

17. The method defined in claim 16 wherein the first feed-forward signal and the second feed-forward signal are provided to separate inputs of the voltage regulating system.

18. The method defined in claim 13 wherein the first gate signal is a read gate signal.

19. The method defined in claim 13 wherein the first gate signal is a servo gate signal.

20. A method for providing a regulated output voltage to a load from a voltage regulating system, the method comprising:

adjusting an output current of the voltage regulating system in response to a feedback signal from an output stage of the voltage regulating system;

generating at least one first feed-forward signal indicative of a deterministic change in a current through the load in response to at least one first input signal that is generated from a source external to the voltage regulating system;

adjusting an output control signal of the voltage regulating system in response to the first feed-forward signal;

multiplying variable weighting coefficients by a plurality of signals that are indicative of deterministic changes in the load current to generate weighted signals;

summing the weighted signals together to generated a summed signal; and generating the first feed-forward signal in response to the summed signal.

21. A voltage regulating system responsive to feed-forward information, the voltage regulating system comprising:

means for receiving an input voltage and providing a regulated output voltage to a load at an output terminal; and means for generating at least one feed-forward signal that is provided to the means for receiving the input voltage, the feed-forward signal indicating a deterministic change in a current through the load in response to a gate signal generated by a hard disk drive controller, wherein the means for receiving the input voltage adjusts its output current in response to the feed-forward signal.

22. The voltage regulating system defined in claim 21 wherein the means for generating at least one feed-forward signal that is provided to the means for receiving the input voltage further comprises means for generating the feed-forward signal that is indicative of the deterministic change in the current through the load before the deterministic change is reflected in the regulated output voltage.

23. The method defined in claim 13 wherein the first feed-forward signal is indicative of the deterministic change in the current through the load before the deterministic change is reflected in the regulated output voltage.

* * * * *